US012441352B2

(12) United States Patent
Sato et al.

(10) Patent No.: US 12,441,352 B2
(45) Date of Patent: Oct. 14, 2025

(54) ATTENTION ATTRACTING SYSTEM AND ATTENTION ATTRACTING METHOD

(71) Applicant: HONDA MOTOR CO., LTD., Tokyo (JP)

(72) Inventors: Masayuki Sato, Wako (JP); Takahiro Matsuoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 18/483,000

(22) Filed: Oct. 9, 2023

(65) Prior Publication Data

US 2024/0149904 A1 May 9, 2024

(30) Foreign Application Priority Data

Nov. 4, 2022 (JP) ................................ 2022-177255

(51) Int. Cl.
*B60W 50/16* (2020.01)
*B60W 30/095* (2012.01)
(Continued)

(52) U.S. Cl.
CPC ........ *B60W 50/16* (2013.01); *B60W 30/0956* (2013.01); *B60W 40/08* (2013.01);
(Continued)

(58) Field of Classification Search
CPC .. B60W 50/16; B60W 30/0956; B60W 40/08; B60W 2040/0827;
(Continued)

(56) References Cited

U.S. PATENT DOCUMENTS 11,242,051 B1 * 2/2022 Konrardy ......... G08G 1/096725
11,713,046 B2 * 8/2023 Goto ..................... B60W 40/04
701/1
(Continued)

FOREIGN PATENT DOCUMENTS

JP          H10-67301 A      3/1998
JP       2008-191988 A      8/2008
(Continued)

OTHER PUBLICATIONS

Japanese Office Action Corresponding to JP Application No. 2022-177255.A dated Aug. 19, 2025, 11 pages.

*Primary Examiner* — Mohamed Barakat
(74) *Attorney, Agent, or Firm* — Rankin, Hill & Clark LLP

(57) ABSTRACT

An attention attracting system includes HMI devices that are mounted on a subject vehicle; and an attention attracting device that transmits, to a driver, a possibility of contact between the subject vehicle and an object through the HMI devices. The attention attracting device includes a processor that identifies a risk position at which the contact occurs and a risk level of the contact, estimates a degree of fatigue of the driver, and transmits the risk position and the risk level to the driver. The processor selects an HMI device to be used in accordance with the degree of fatigue of the driver, provides a tactile stimulus or an auditory stimulus to the driver through a tactile HMI device or an auditory HMI device at a remarkableness level corresponding to height of the risk level, and transmits visual information to the driver through a visual HMI device.

11 Claims, 8 Drawing Sheets

(51) Int. Cl.
*B60W 40/08* (2012.01)
*B60W 50/14* (2020.01)

(52) U.S. Cl.
CPC .............. *B60W 2040/0827* (2013.01); *B60W 2050/143* (2013.01); *B60W 2050/146* (2013.01); *B60W 2540/225* (2020.02); *B60W 2540/229* (2020.02)

(58) Field of Classification Search
CPC ..... B60W 2050/143; B60W 2050/146; B60W 2540/225; B60W 2540/229
See application file for complete search history.

(56) References Cited

U.S. PATENT DOCUMENTS

| | | | |
|---|---|---|---|
| 2008/0186382 A1 | 8/2008 | Tauchi et al. | |
| 2013/0226408 A1* | 8/2013 | Fung | G08G 1/166 |
| | | | 701/1 |
| 2019/0263395 A1* | 8/2019 | Hoetzer | B60W 30/12 |
| 2021/0039638 A1* | 2/2021 | Yasui | B60W 40/08 |
| 2021/0401340 A1* | 12/2021 | Gallagher | A61B 5/7405 |
| 2022/0095975 A1* | 3/2022 | Aluf | A61B 3/113 |
| 2022/0161813 A1* | 5/2022 | Oba | G08G 1/09675 |
| 2022/0242364 A1 | 8/2022 | Odai et al. | |
| 2022/0340079 A1* | 10/2022 | Yang | G08B 21/06 |

FOREIGN PATENT DOCUMENTS

| | | |
|---|---|---|
| JP | 2016-024778 A | 2/2016 |
| JP | 2022-119571 A | 8/2022 |

* cited by examiner

FIG. 4

| RISK POSITION | | STATE OF DRIVER | | | | SELECTION OF HMI DEVICE | | |
|---|---|---|---|---|---|---|---|---|
| | | FATIGUE STATE | VISUAL RECOGNITION OF RISK | EVASIVE STEERING | | TACTILE HMI DEVICE | AUDITORY HMI DEVICE | VISUAL HMI DEVICE |
| AHEAD | FIRST STATE | NO | YES | YES | | | | |
| | SECOND STATE | | | NO | | USE | | |
| | THIRD STATE | YES | NO | NOT APPLIED | | USE | | USE |
| | FOURTH STATE | | NOT APPLIED | NOT APPLIED | | USE | USE | USE |
| BEHIND | FIRST STATE | NO | YES | YES | | | | |
| | SECOND STATE | | | NO | | | USE | |
| | THIRD STATE | YES | NO | NOT APPLIED | | USE | USE | USE |
| | FOURTH STATE | | NOT APPLIED | NOT APPLIED | | | USE | USE |

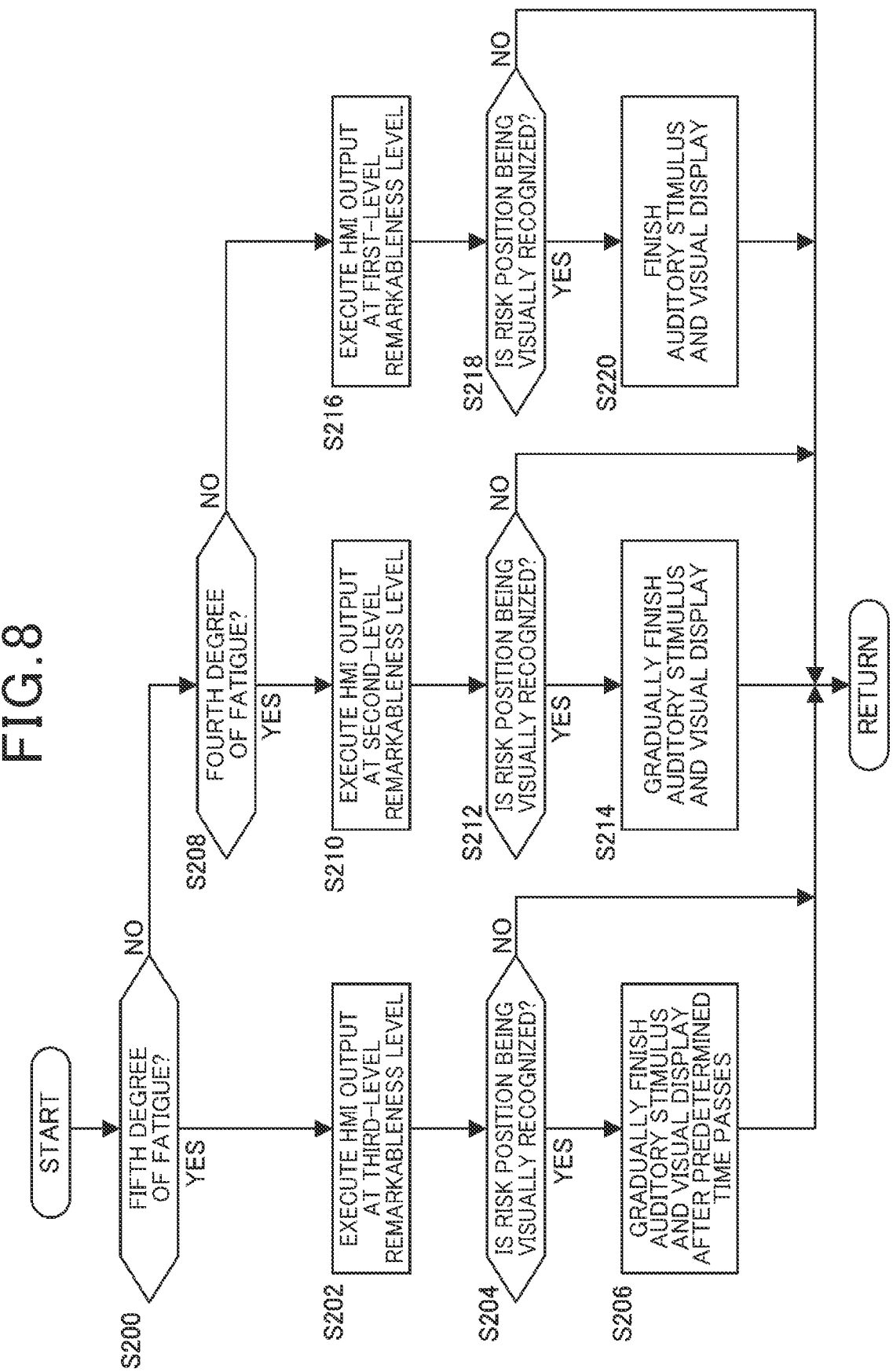

ATTENTION ATTRACTING SYSTEM AND ATTENTION ATTRACTING METHOD

INCORPORATION BY REFERENCE

The present application claims priority under 35 U.S.C. § 119 to Japanese Patent Application No. 2022-177255 filed on Nov. 4, 2022. The content of the application is incorporated herein by reference in its entirety.

BACKGROUND OF THE INVENTION

Field of the Invention

The present invention relates to an attention attracting system and an attention attracting method that each attract the attention of a driver of a vehicle.

Description of the Related Art

In recent years, more active efforts have been made to provide access to a sustainable transportation system that takes into consideration even people at vulnerable positions among traffic participants. To achieve this, efforts have been invested in research and development for still further improving traffic safety and convenience by researching and developing preventive safety technology.

Japanese Patent Laid-Open No. 10-67301 describes that a seat belt tension generation device and a sound generation device issue approach alarms at the same time each for notifying a driver of the approach of a subject vehicle to an object ahead to inform the driver of the approach alarms in a reliable manner that does not cause the driver to have a strange feeling or the like. In addition, Japanese Patent Laid-Open No. 10-67301 describes that the approach alarms are canceled when a certain period of time passes after the approach alarms are issued or when a braking operation is detected.

Incidentally, the preventive safety technology has a goal of transmitting a risk of contact with an object around a subject vehicle in accordance with a state of a driver at the moment in a manner that allows the driver to recognize the risk more reliably.

To achieve the goal described above, an object of this application is to transmit the risk of the contact with the object around the subject vehicle in accordance with the state of the driver and the degree of fatigue of the driver in particular in a manner that allows the driver to recognize the risk more reliably. This eventually contributes to the development of the sustainable transportation system.

SUMMARY OF THE INVENTION

An aspect of the present invention is an attention attracting system including: HMI devices that are mounted on a subject vehicle; and an attention attracting device configured to transmit, to a driver, a possibility of contact between the subject vehicle and an object through the HMI devices. The HMI devices include a tactile HMI device, an auditory HMI device, and a visual HMI device. The tactile HMI device provides a stimulus to a tactile perception of the driver. The auditory HMI device outputs sound to the driver. The sound serves as an auditory stimulus. The visual HMI device transmits visual information to the driver. The attention attracting device includes a risk identification section configured to identify a risk position and a risk level, a fatigue estimation section configured to estimate a degree of fatigue of the driver, and a transmission section configured to transmit the risk position and the risk level to the driver. The risk position is a position having a strong possibility of contact occurring between the subject vehicle and an object in an environment surrounding the subject vehicle. The risk level is a degree of the possibility of the contact occurring at the risk position. The transmission section selects the HMI device to be used in accordance with the degree of fatigue of the driver, provides a tactile stimulus or an auditory stimulus to the driver through the tactile HMI device or the auditory HMI device at a remarkableness level corresponding to strength of the possibility of the contact indicated by the risk level, and transmits visual information to the driver through the visual HMI device. The visual information indicating a direction of the risk position viewed from the driver.

According to another aspect of the present invention, when the risk position identified by the risk identification section is located in a region ahead of the subject vehicle, the transmission section provides height of the risk level to the driver through the tactile HMI device as a tactile stimulus, and when the risk position identified by the risk identification section is located in a region other than the region ahead of the subject vehicle, the transmission section provides the height of the risk level to the driver through the auditory HMI device as an auditory stimulus.

According to another aspect of the present invention, the attention attracting device includes a line-of-sight determination section configured to determine whether or not the driver has a line of sight in the direction of the risk position, and an evasion determination section configured to determine whether or not the driver is performing evasive steering that is a steering action for evading the contact which is possible contact. The transmission section identifies a state of the driver as any of a first state, a second state, a third state, and a fourth state on the basis of a result of a degree-of-fatigue estimation of the driver by the fatigue estimation section and results of determinations by the line-of-sight determination section and the evasion determination section, and provides the tactile stimulus or the auditory stimulus to the driver by using the tactile HMI device or the auditory HMI device unless the state of the driver is the first state. The first state is a state in which the driver is not in the fatigue state, has the line of sight in the direction of the risk position, and is performing the evasive steering. The second state is a state in which the driver is not in the fatigue state, has the line of sight in the direction of the risk position, and is not performing the evasive steering. The third state is a state in which the driver is not in the fatigue state and does not have the line of sight in the direction of the risk position. The fourth state is a state in which the driver is in the fatigue state.

According to another aspect of the present invention, the transmission section sets the remarkableness level of the tactile stimulus or the auditory stimulus to be provided to the driver by using the tactile HMI device or the auditory HMI device to cause the remarkableness level to be higher when the driver is in the third state than the remarkableness level set when the driver is in the second state, and the remarkableness level to be higher when the driver is in the fourth state than the remarkableness level set when the driver is in the third state.

According to another aspect of the present invention, the transmission section sets respective remarkableness levels of the tactile stimulus or the auditory stimulus, and/or the visual information at different levels in accordance with the degree of fatigue of the driver and provides the tactile stimulus or the auditory stimulus, and/or the visual information at the respective set remarkableness levels to the driver.

According to another aspect of the present invention, when it is determined after the auditory stimulus and/or the visual information is provided to the driver that the driver has the line of sight in the direction of the risk position, the transmission section finishes an output of the auditory stimulus and/or the visual information in different manners corresponding to the degree of fatigue of the driver.

According to another aspect of the present invention, when the risk position identified by the risk identification section is located in the region other than the region ahead of the subject vehicle, the line-of-sight determination section determines whether or not the driver has the line of sight in the direction of the risk position through a mirror included in the subject vehicle upon determining that the driver does not have the line of sight in the direction of the risk position.

According to another aspect of the present invention, the tactile HMI device is an electric seat belt that is provided to a driver's seat of the subject vehicle. The electric seat belt provides a tactile stimulus to the driver by changing tension of a seat belt worn by the driver. The remarkableness level of the tactile stimulus corresponds to magnitude of the tension of the seat belt.

According to another aspect of the present invention, the auditory HMI device is a speaker that is provided in a vehicle compartment of the subject vehicle. The remarkableness level of the auditory stimulus corresponds to intensity, height of frequency, and/or shortness of a repetition cycle of sound that is output by the speaker and/or shortness of a change cycle of the intensity or the frequency.

According to another aspect of the present invention, the visual HMI device is a meter display device that is provided in an instrument panel of the subject vehicle. The transmission section displays a predetermined figure on the meter display device, transmits, to the driver, the direction of the risk position viewed from the driver by using a display position of the predetermined figure on the meter display device, and transmits, to the driver, height of the risk level by using a size and/or a color of the predetermined figure on the meter display device. The predetermined figure is for transmitting, to the driver, the possibility of the contact.

Another aspect of the present invention is an attention attracting method that is executed by a computer of an attention attracting system. The attention attracting system includes HMI devices and an attention attracting device. The HMI devices include a tactile HMI device, an auditory HMI device, and a visual HMI device. The HMI devices are each mounted on a subject vehicle. The tactile HMI device provides a stimulus to a tactile perception of a driver. The auditory HMI device outputs sound to the driver. The sound serves as an auditory stimulus. The visual HMI device transmits visual information to the driver. The attention attracting device is configured to transmit, to the driver, a possibility of contact between the subject vehicle and an object through the tactile HMI device, the auditory HMI device, and/or the visual HMI device. The attention attracting method includes: a risk identification step of identifying a risk position and a risk level; a fatigue estimation step of estimating a degree of fatigue of the driver; and a transmission step of transmitting the risk position and the risk level to the driver. The risk position is a position having a strong possibility of contact occurring between the subject vehicle and an object in an environment surrounding the subject vehicle. The risk level is a degree of the possibility of the contact occurring at the risk position. In the transmission step, the HMI device to be used is selected in the degree of fatigue of the driver. A tactile stimulus or an auditory stimulus is provided to the driver through the tactile HMI device or the auditory HMI device at a remarkableness level corresponding to strength of the possibility of the contact indicated by the risk level. Visual information is transmitted to the driver through the visual HMI device. The visual information indicates a direction of the risk position viewed from the driver.

Advantageous Effects of Invention

According to the present invention, it is possible to transmit a risk of contact with an object around a subject vehicle in accordance with a degree of fatigue of a driver in a manner that allows the driver to recognize the risk more reliably.

BRIEF DESCRIPTION OF THE DRAWINGS

FIG. 4 is a diagram illustrating an example in which different HMI devices are used in accordance with a state of a driver;

FIG. 8 is a flowchart illustrating a procedure of degree-of-fatigue dependence processing in FIG. 7.

DETAILED DESCRIPTION OF THE PREFERRED EMBODIMENTS

The following describes embodiments of the present invention with reference to the drawings.

Figure 1:
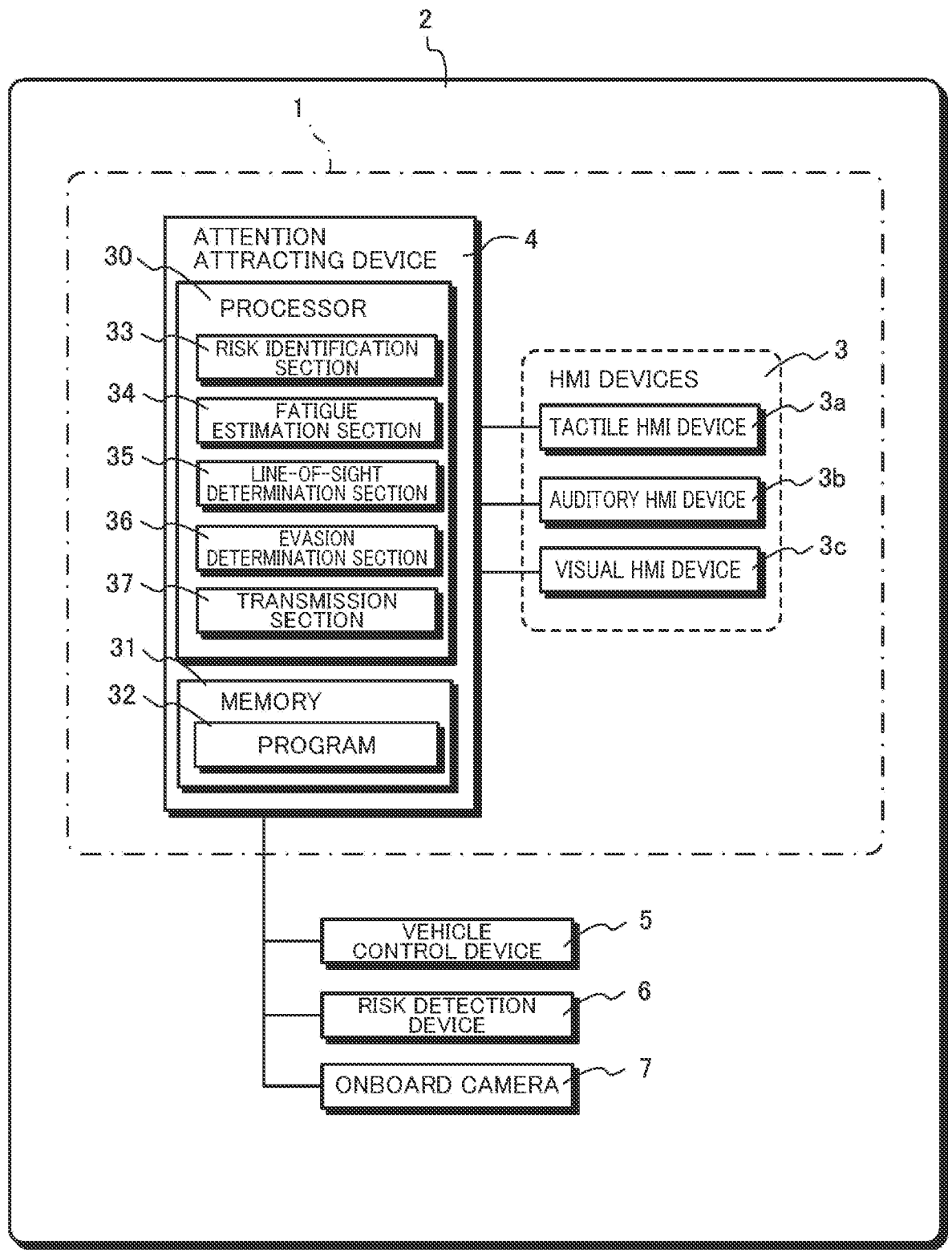
FIG. 1 is a diagram illustrating a configuration of an attention attracting system according to an embodiment of the present invention.
Figure 2:
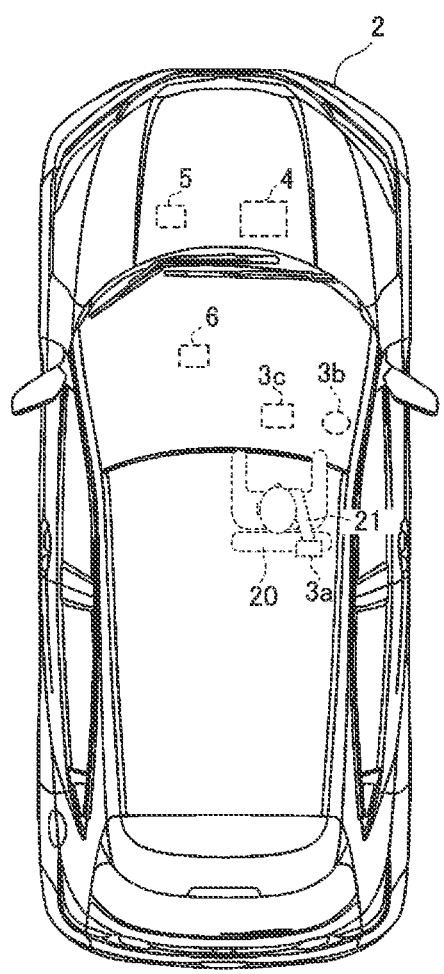
FIG. 2 is a diagram illustrating a configuration of a subject vehicle that is mounted with the attention attracting system.
Figure 3:
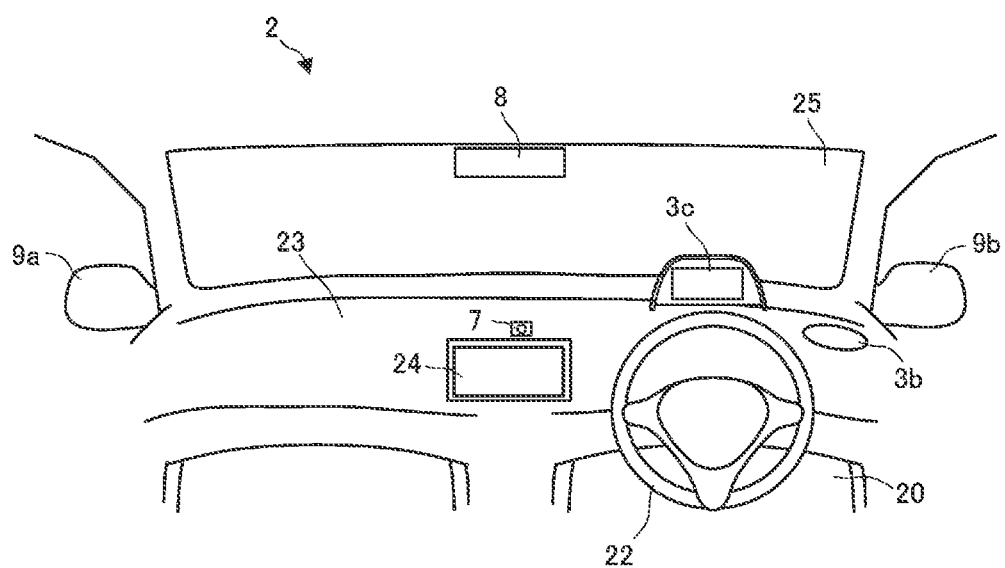
FIG. 3 is a diagram illustrating a configuration of a vehicle compartment of the subject vehicle that is mounted with the attention attracting system.

FIG. 1 is a diagram illustrating a configuration of an attention attracting system 1 according to an embodiment of the present invention. In addition, FIG. 2 is a diagram illustrating a configuration of a subject vehicle 2 that is mounted with the attention attracting system 1 and FIG. 3 is a diagram illustrating a configuration of the vehicle compartment of the subject vehicle 2.

The attention attracting system 1 is mounted on the subject vehicle 2. The attention attracting system 1 transmits, to a driver, a position (that will be referred to as "risk position" below) having a strong possibility of contact occurring between the subject vehicle 2 and an object in an environment surrounding the subject vehicle 2 and a risk level that is the degree of the possibility of the above-described contact occurring at the risk position. Here, the "subject vehicle" means a vehicle mounted with the attention attracting system 1.

The attention attracting system 1 includes HMI devices 3 and an attention attracting device 4 that are mounted on the subject vehicle 2. The HMI devices 3 include a tactile HMI device 3a, an auditory HMI device 3b, and a visual HMI device 3c. The tactile HMI device 3a provides a stimulus to the tactile perception of the driver. The auditory HMI device 3b outputs sound to the driver. The sound serves as an auditory stimulus. The visual HMI device 3c transmits visual information to the driver.

The tactile HMI device 3a is an electric seat belt that is provided, for example, to a driver's seat 20 of the subject vehicle 2 and provides a tactile stimulus to the driver by changing the tension of a seat belt 21 worn by the driver. The electric seat belt is, however, an example. The tactile HMI device 3a may be any device capable of providing a tactile stimulus to the driver. For example, the tactile HMI device 3a may also be a vibration actuator, a massage seat, or the like. The vibration actuator provides vibration to the hands of a driver through a steering wheel 22. The massage seat is provided as the driver's seat 20 and provides a stimulus, for example, by patting, kneading, pressing, or vibrating a body part of a driver such as the back.

In the present embodiment, the auditory HMI device 3b is a single speaker. Alternatively, the auditory HMI device 3b may be a speaker system including a plurality of speakers.

In the present embodiment, the visual HMI device 3c is a meter display device that is provided in an instrument panel 23 of the subject vehicle 2. The meter display device is, however, an example. The visual HMI device 3c may be a general-purpose display device 24, a head-up display (not illustrated), or the like. The general-purpose display device 24 displays a reading other than the meter reading. The head-up display displays an image on a windshield 25.

The subject vehicle 2 also includes a vehicle control device 5 that has a processor, and the processor detects the operation state of a steering operation device such as the accelerator pedal, the brake pedal, the direction indicator lamps, or the steering wheel 22 of the subject vehicle 2 and detects a motion state such as the vehicle speed, the acceleration, or the yaw rate of the subject vehicle 2.

The subject vehicle 2 further includes a risk detection device 6 that detects the presence of a risk of contact between the subject vehicle 2 and an object (including a traffic participant) in an environment surrounding the subject vehicle 2. The risk detection device 6 has a processor, and the processor identifies a risk position, for example, on the basis of pieces of information from one or more cameras, radars, lidars, and/or sonars distributed to the vehicle body of the subject vehicle 2, positioning data, and map information and calculates a risk level. The positioning data and the map information are acquired from a GPS apparatus and the like (neither of which are illustrated). The risk position is a position having a strong possibility of contact occurring between the subject vehicle 2 and an object. The risk level is the degree of the possibility of the above-described contact occurring at the risk position. The map information described above may include pieces of information related to road shapes such as an intersection, a straight road, and a curve, traffic infrastructure such as a traffic light, the disposition of a building, and the like.

The risk detection device 6 predicts the traffic lines of an object in a surrounding environment and the subject vehicle 2 on the basis of the position, the movement direction, and the speed of the object, the position, the movement direction, and the speed of the subject vehicle 2, the lighting state of a traffic light, and the like, for example, in accordance with traditional technology. The risk detection device 6 may then calculate the risk position and the risk level from the position at which the subject vehicle 2 and the object described above come the closest to each other and the distance between the subject vehicle 2 and the object described above at the position. According to the traditional technology, when the object is a vehicle, the risk detection device 6 may take into consideration the lighting states of the direction indicator lamps and the brake lamps of the vehicle to predict the traffic line of the object. When the object is a pedestrian, the risk detection device 6 may take into consideration the orientation of the face of the pedestrian and the like to predict the traffic line of the object. Similarly, to predict the traffic line of the subject vehicle 2, the risk detection device 6 may take into consideration the lighting states of the direction indicator lamps and the brake lamps of the subject vehicle 2 acquired from the vehicle control device 5. If a navigation device (not illustrated) is guiding a route, the risk detection device 6 may take into consideration the route that is being guided.

In addition, the risk detection device 6 does not only detect a risk of contact between the subject vehicle 2 and an object that is actually detected in an environment surrounding the subject vehicle 2, but may also infer and detect a risk of contact with an object (such as a virtual vehicle or pedestrian) that has not yet been detected, but can appear on the basis of even visibility, the number of accidents, and the like at an intersection or the like.

The subject vehicle 2 is also provided with an onboard camera 7, a rear-view mirror 8, and door mirrors 9a and 9b. The onboard camera 7 captures an image of the vehicle compartment including the driver. The rear-view mirror 8 is used for the driver to visually recognize a region behind the subject vehicle 2. The door mirrors 9a and 9b are used for the driver to visually recognize regions behind to the left and right sides of the subject vehicle 2. The rear-view mirror 8 may be a rear-view mirror that displays an image of a back camera (not illustrated) which images the region behind the subject vehicle 2.

The attention attracting device 4 includes a processor 30 and a memory 31. The memory 31 includes, for example, a volatile and/or non-volatile semiconductor memory, and/or a hard disk device, and/or the like. The processor 30 is, for example, a computer including a CPU and the like. The processor 30 may include a ROM in which a program is written, an RAM for temporarily storing data, and the like. The processor 30 then includes a risk identification section 33, a fatigue estimation section 34, a line-of-sight determination section 35, an evasion determination section 36, and a transmission section 37 as functional elements or functional units.

These functional elements included in the processor 30 are implemented by the processor 30 executing a program 32 stored in the memory 31. The processor 30 is, for example, a computer. It is to be noted that it is possible to store the program 32 in any computer-readable storage medium. Instead of this, it is also possible to configure all or some of the above-described functional elements included in the processor 30 by using hardware including one or more electronic circuit parts.

The risk identification section 33 identifies risk positions and risk levels at predetermined time intervals. The risk positions are positions each having a strong possibility of contact occurring between the subject vehicle 2 and an object in an environment surrounding the subject vehicle 2. The risk level is the degree of the possibility of the above-described contact occurring at the risk position. In the present embodiment, the risk identification section 33 acquires pieces of information related to the risk positions and the risk levels from the risk detection device 6 at the predetermined time intervals to grasp the presence of the risk of the contact and identify the risk position and the risk level at the current time.

The fatigue estimation section 34 estimates the degree of fatigue of a driver of the subject vehicle 2. For example, the fatigue estimation section 34 evaluates the degree of drowsiness of the driver to estimate the degree of fatigue of the driver at a 5-grade fatigue level. For example, the fatigue estimation section 34 follows the traditional technology and evaluates the drowsiness of the driver in five grades including "not drowsy", "slightly drowsy", "drowsy", "moderately drowsy", and "extremely drowsy" (Reference: "Doraiba Monitaringu (Nemuke/Inemuri Kenchi) Sisutemu Kihon Sekkeisho (in Japanese)" (Basic Design Plan of Driver Monitoring (Drowsiness/Doze Detection) System) created by Study Group for the Promotion of ASV, Road Transport Bureau, the Ministry of Land, Infrastructure, Transport and Tourism in October, 2020) on the basis of a facial expression and a movement of an eyelid (e.g., the blinking frequency, the changing opening degree of an eyelid, and the like) of the driver determined from a face image of the driver from the onboard camera 7, the pulse waves of the driver detected from the face image, and the like. The fatigue estimation section 34 then defines these grades of drowsiness as first, second, third, fourth, and fifth degrees of fatigue in this order. In addition, the fatigue estimation section 34 determines, as a fatigue state, a state in which the third and higher degrees of fatigue are estimated and determines, as a non-fatigue state, a state in which the first and second degrees of fatigue are estimated.

Instead of or in addition to the evaluation of drowsiness described above, it is possible for the fatigue estimation section 34 to make a 5-grade degree-of-fatigue estimation and make a fatigue state/non-fatigue state determination similar to those described above on the basis of an unsteady driving operation performed by a driver on the subject vehicle 2, and/or the sway of the traveling subject vehicle 2 (fluctuating traveling direction), and/or the like. The unsteady driving operation described above may be determined, for example, from the statistics of temporal changes in the operation amounts for the accelerator pedal, the brake pedal, and the steering wheel. The temporal changes are obtained from the vehicle control device 5. In addition, for example, following the traditional technology, it is possible to evaluate the sway of traveling described above in a steering entropy method on the basis of a temporal change in the steering angle of the steering wheel that is obtained from the vehicle control device 5.

Alternatively, the fatigue estimation section 34 may estimate the current degree of fatigue of a driver on the basis of the time elapsed since the start of the driver's driving the subject vehicle 2, the type of a road (e.g., an expressway, a city road, a narrow road, or the like) on the taken route, the condition of a travelled road (e.g., the traffic volume, the presence or absence of traffic congestion), or the like. For example, it is possible for the fatigue estimation section 34 to detect that the subject vehicle 2 starts to be driven on the basis of information (e.g., ON information of the vehicle power supply, vehicle speed information, or the like) obtained from the vehicle control device 5. In addition, it is possible for the fatigue estimation section 34 to obtain information related to the type of a road travelled by the subject vehicle 2 or the condition of the road from a vehicle navigation device (not illustrated) included in the subject vehicle 2.

The line-of-sight determination section 35 determines whether or not the driver has the line of sight in the direction of the current risk position identified by the risk identification section 33. The line of sight is determined from the face image of the driver from the onboard camera 7. When the risk position is located in a region (e.g., a region on a side of or behind the subject vehicle 2) other than the region ahead of the subject vehicle 2, it is possible for the line-of-sight determination section 35 to determine not only whether or not the driver has the direct line of sight in the direction of the risk position, but also whether or not the driver has the line of sight in the direction of the risk position through a mirror such as the rear-view mirror 8 or the door mirror 9a or 9b included in the subject vehicle 2. The direct line of sight is determined from the face image of the driver.

It is to be noted that, when the risk position is located in a blind spot which is not visually recognizable to the driver even through a mirror or the like, it is possible for the line-of-sight determination section 35 to constantly determine that the driver does not have the line of sight in the direction of the risk position. Here, information related to the position or region of a blind spot for the subject vehicle 2 may be stored in the memory 31 in advance.

The evasion determination section 36 determines whether or not the driver of the subject vehicle 2 is performing evasive steering that is a steering action for evading possible contact occurring between the subject vehicle 2 and an object at the current risk position identified by the risk identification section 33 (i.e., for evading a risk of contact). For example, the evasion determination section 36 determines whether or not the driver is performing evasive steering from information related to an operation on the brake pedal, the accelerator pedal, and/or the steering wheel acquired from the vehicle control device 5. Specifically, for example, when an object that can come into contact is a preceding vehicle, it is possible for the evasion determination section 36 to determine that a driver is performing evasive steering at the time of the detection of all or a portion of a series of actions of the driver and behaviors of the subject vehicle that the driver starts to decrease the stepping force on the accelerator pedal and the acceleration of the subject vehicle changes from a positive value (acceleration) to a negative value (deceleration), and the driver releases the foot from the accelerator pedal and then starts to step on the brake pedal and the subject vehicle turns on a brake lamp and the time to headway to the preceding vehicle changes to a positive value.

The transmission section 37 transmits, to the driver of the subject vehicle 2, the current risk position and risk level with respect to the risk of the contact between the subject vehicle 2 and the object identified by the risk identification section 33.

In the present embodiment, the transmission section 37 provides a tactile stimulus or an auditory stimulus to the driver through the tactile HMI device 3a or the auditory HMI device 3b at a remarkableness level corresponding to the strength of the possibility of the above-described contact indicated by the risk level and transmits, to the driver through the visual HMI device 3c, visual information indicating the direction of the risk position viewed from the driver or visual information indicating the direction of the risk position viewed from the driver and the height of the risk level.

In the present embodiment, in particular, the transmission section 37 selects the above-described HMI device 3 to be used in accordance with the degree of fatigue of a driver estimated by the fatigue estimation section 34 and transmits the risk position and/or the risk level described above by using the selected HMI device 3 described above.

The configuration described above makes it possible to reliably inform the driver of the presence of a risk of contact with a tactile stimulus or an auditory stimulus perceivable to the driver regardless of the attention state of the driver or the driver's line-of-sight direction even when the driver is in an inattention state. Meanwhile, it is possible to inform the driver of the risk of contact for confirmation when the driver is able to concentrate on driving and secondarily inform the driver of the risk position and the height thereof with the visual information.

In addition, according to the configuration described above, the different HMI devices 3 are used for transmission in accordance with the degree of fatigue of a driver. This makes it possible to transmit a risk of contact with an object around the subject vehicle in accordance with the degree of fatigue of the driver at the moment in a manner that allows the driver to recognize the risk more reliably.

Here, the remarkableness level is the strength degree to which a stimulus attracts or catches the attention of a person.

For example, when a tactile stimulus is output as the tension of an electric seat belt, the remarkableness level of the tactile stimulus corresponds to the magnitude of the tension described above. As the tension described above increases, the tension provides a tactile stimulus at a higher remarkableness level.

In addition, for example, the remarkableness level of the auditory stimulus corresponds to the intensity, the height of the frequency, and/or the shortness of the repetition cycle of sound that serves as an auditory stimulus and/or the shortness of the change cycle of the intensity or the frequency. As the intensity of sound increases, as the frequency is increases, as the repetition cycle described above decreases, and/or as the change cycle of the intensity or the frequency decreases, the sound provides an auditory stimulus at a higher remarkableness level.

Alternatively, when the tactile stimulus is vibration provided to the hands of the driver from the vibration actuator provided to the steering wheel 22 as described above, the remarkableness level of the tactile stimulus corresponds to the intensity, the height of the frequency, and/or the shortness of the repetition cycle of the vibration and/or the shortness of the change cycle of the intensity or the frequency. As the intensity of vibration increases, as the frequency is increases, as the repetition cycle described above decreases, and/or as the change cycle of the intensity or the frequency decreases, the vibration provides a tactile stimulus at a higher remarkableness level.

Alternatively, when visual information is output as a graphic element such as a character or a figure displayed on the display device, the remarkableness level of the visual information may be decided on the basis of the luminance of the displayed graphic element, the change cycle of the luminance, the blinking cycle, or the color tint. For example, as the luminance described above increases, the change cycle of the luminance or the blinking cycle decreases, or as the color tint approaches a warm color from a cold color, the visual information has a higher remarkableness level.

It is to be noted that it is possible to predefine and store the relationships between the detailed manner (the above-described intensity, frequency, tension, luminance, luminance change, or the like of the variety of stimuli or the visual information described above) of a tactile stimulus, an auditory stimulus, and/or visual information and the height of the remarkableness level in the memory 31. It is possible for the transmission section 37 to transmit the risk level and the risk position to the driver by using the tactile stimulus, the auditory stimulus, and/or the visual information in the manner corresponding to the height of the remarkableness level decided on the basis of the risk level described above with reference to the information related to the relationships described above.

Specifically, the transmission section 37 identifies the state of the driver of the subject vehicle 2 as any of the following four states specifically on the basis of results of determinations by the fatigue estimation section 34, the line-of-sight determination section 35, and the evasion determination section 36:

a first state in which the driver is not in the fatigue state, has the line of sight in the direction of the risk position, and is performing the evasive steering;

a second state in which the driver is not in the fatigue state, has the line of sight in the direction of the risk position, and is not performing the evasive steering;

a third state in which the driver is not in the fatigue state and does not have the line of sight in the direction of the risk position; and a fourth state in which the driver is in the fatigue state.

The transmission section 37 then uses any of the tactile HMI device 3a, the auditory HMI device 3b, and the visual HMI device 3c in accordance with which of the four states described above is the state of the driver to transmit, to the driver, the risk position and the risk level with respect to the risk of the contact between the subject vehicle 2 and the object.

FIG. 4 is a diagram illustrating the states of a driver and the HMI devices 3 used by the transmission section 37 for transmission to the driver for the respective risk positions divided into the region ahead of the subject vehicle 2 and the region behind the subject vehicle 2.

The leftmost column of the table illustrated in FIG. 4 has a distinction between a risk position located in the region ahead of the subject vehicle 2 and a risk position located in a region behind the subject vehicle 2. The right side thereof illustrates which of the HMI devices 3 is used when the state of the driver is the first state to the fourth state. In the column of "SELECTION OF HMI DEVICE", a field in which "USE" is written means that the HMI device 3 is used in that state of the driver to output a stimulus. In addition, a blank field in the column of "SELECTION OF HMI DEVICE" means that the HMI device 3 is not used (no stimulus or information is output) in that state of the driver.

According to the table illustrated in FIG. 4, the transmission section 37 transmits a tactile stimulus to the driver through the tactile HMI device 3a at the remarkableness level corresponding to the height of the risk level, for example, when the risk position is located in the region ahead of the subject vehicle 2. When the risk position is located in the region behind the subject vehicle 2, the transmission section 37 provides an auditory stimulus to the driver described above through the auditory HMI device 3b at the remarkableness level corresponding to the height of the risk level. According to this configuration, the HMI device 3 to be used is switched to the tactile HMI device 3a or the auditory HMI device 3b in accordance with which of the region ahead of the subject vehicle 2 and the region behind the subject vehicle 2 has the risk position. This allows the driver to intuitively grasp which of the region ahead and the region behind has the risk position by receiving any of a tactile stimulus and an auditory stimulus.

Specifically, the transmission section 37 transmits a tactile stimulus or an auditory stimulus to the driver by using the tactile HMI device 3a and/or the auditory HMI device 3b unless the driver is in the first state (i.e., when the driver is in the second state, the third state, or the fourth state) as illustrated in the table of FIG. 4. According to this configuration, the transmission section 37 refrains from transmitting the risk of the contact to the driver with a tactile stimulus or an auditory stimulus in accordance with the attention state of the driver with respect to the risk of the contact when the driver is recognizing the risk of the contact and is performing evasive steering (i.e., when the driver is in the first state). This makes it possible to prevent the driver from being bothered by the unnecessary transmission of the risk of the contact.

Here, it is possible for the transmission section 37 to provide a tactile stimulus and/or an auditory stimulus to the driver at a different remarkableness level in spite of the same risk level in accordance with which of the second state, the third state, and the fourth state is the driving state.

In the case of the table illustrated in FIG. 4, the transmission section 37 sets the remarkableness level of the tactile stimulus and/or the auditory stimulus to be provided to the driver by using, for example, the tactile HMI device 3a or the auditory HMI device 3b to cause the remarkableness level to be higher when the driver is in the third state than the remarkableness level set when the driver is in the second state and cause the remarkableness level to be higher when the driver is in the fourth state than the remarkableness level set when the driver is in the third state.

According to this configuration, a tactile stimulus and/or an auditory stimulus is provided to the driver at a different remarkableness level in accordance with the degree of the attention of the driver to the risk of contact. This makes it possible to transmit information related to the risk of the contact in accordance with the degree of the attention described above in a manner that does not bother the driver.

In addition, in the table illustrated in FIG. 4, the transmission section 37 uses the visual HMI device 3c to transmit, to the driver, visual information indicating the direction of the risk position viewed from the driver when the driver is in the third state or the fourth state, for example, whether the risk position is located in the region ahead of the subject vehicle 2 or the region behind the subject vehicle 2. In this case, the transmission section 37 may also transmit the height of the risk level to the driver as visual information in addition to the direction of the risk position.

Figure 5:
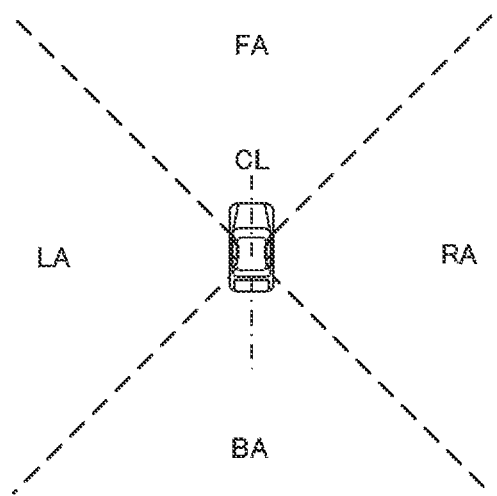
FIG. 5 is a diagram illustrating an example of division of an area around the subject vehicle for defining a direction of a risk position.

For example, the transmission section 37 divides a region surrounding the subject vehicle 2 into the four areas illustrated in FIG. 5 and displays, on the visual HMI device 3c, information indicating in which direction the area having the risk position is located. In FIG. 5, the four areas each having a vertex angle of 90 degrees are defined with the subject vehicle 2 serving as the center. A front area FA and a back area BA are an area extending ahead of the subject vehicle 2 and an area extending behind the subject vehicle 2, respectively. The front area FA and the back area BA are each defined by two lines that make angles of ±45 degrees to a central line CL in a vehicle width direction. In addition, a left area LA and a right area RA are defined on the left and right of the front area FA and the back area BA.

The transmission section 37 displays a predetermined figure on the visual HMI device 3c for transmitting a possibility of contact between the subject vehicle 2 and an object. The visual HMI device 3c is, for example, a meter display device. The transmission section 37 transmits, to the driver, the direction of the risk position viewed from the driver by using the display position of the figure described above on the meter display device described above and transmits the height of the risk level to the driver by using the color and/or the size of the figure described above on the meter display device described above. According to this configuration, the visual HMI device 3c provides visual information in the same changing manner as that of a tactile stimulus and/or an auditory stimulus transmitted by the tactile HMI device 3a and/or the auditory HMI device 3b at the remarkableness level corresponding to the risk level. This allows the driver to recognize the height of the risk level more clearly.

Figure 6A:
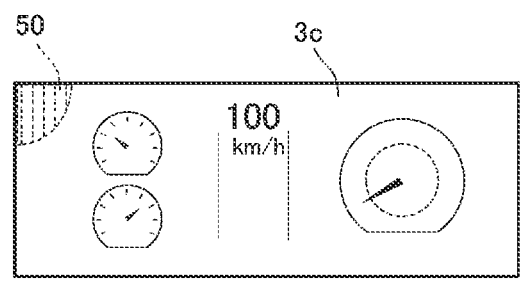
FIGS. 6A to 6C are diagrams each illustrating an example in which a warning figure is displayed in a visual HMI device.
Figure 6B:
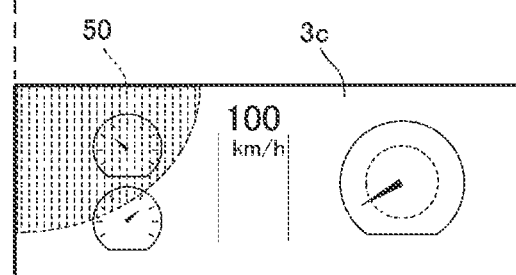
Figure 6C:
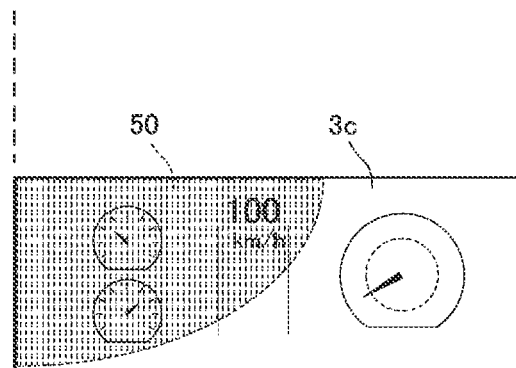

FIGS. 6A to 6C are diagrams each illustrating an example of visual information output by the transmission section 37 to the visual HMI device 3c that is a meter display device. The example of each of FIGS. 6A to 6C illustrates a case where a risk position is located in the left area LA in FIG. 5. In addition, FIGS. 6A, 6B, and 6C illustrate changes in the visual information made when the risk level increases in this order.

Right after a collision risk is detected, the transmission section 37 first displays a small warning graphic 50 in pale red at the position of the upper left corner of the screen of the visual HMI device 3c as in FIG. 6A, thereby transmitting the presence of the collision risk and the risk position being located in the left area LA of the subject vehicle 2 to the driver.

After that, as the risk level increases, the transmission section 37 expands the warning graphic 50 (the hatched portion in the diagram) on the screen of the visual HMI device 3c in the right direction of the diagram as in FIG. 6B to increase the warning graphic 50 in size and change the color of the warning graphic 50 to dark red. This increases the color density of the warning graphic 50 to allow the driver to notice the presence of the warning graphic 50 more easily and recognize the degree of the increase in the risk level from the degree of the increase in the size of the warning graphic 50. It is to be noted that FIGS. 6A to 6C each express the increase in the color density of the warning graphic 50 by using the density of the hatching in the diagram.

When time further passes and the risk level increases to ask for an emergency action on the risk, the transmission section 37 makes a change to further increase the red color density and further increases the warning graphic 50 in size as in FIG. 6C. It is preferable that the size and the color density of the warning graphic 50 in this case be large and dark enough to allow even the driver not looking at the screen of the visual HMI device 3c to see the warning graphic 50 on the edge of the driver's view. In the example of FIG. 6C, the warning graphic 50 has a large size to extend to the position substantially in the middle of the screen.

It is to be noted that the transmission section 37 may decide the display position of the warning graphic 50 on the screen described above in accordance with the direction of the risk position. For example, if the risk positions are in the right area RA, the front area FA, and the back area BA, the transmission section 37 may display the respective warning FIG. 50 at the positions of the upper right corner, the middle of the upper side, and the middle of the lower side on the screen described above and increase the warning FIG. 50 in size from the respective positions in accordance with the increases in the risk levels.

With reference to FIG. 4, when a driver is in the fourth state, the transmission section 37 transmits the risk position and the risk level by providing a tactile stimulus, an auditory stimulus, and visual information to the driver through the tactile HMI device 3a, the auditory HMI device 3b, and the visual HMI device 3c.

In the present embodiment, in particular, when a driver is in the fourth state, the transmission section 37 sets the respective remarkableness levels of a tactile stimulus or an auditory stimulus, and/or visual information to be output through these HMI devices 3 at different levels in accordance with the degree of fatigue of the driver and provides a tactile stimulus or an auditory stimulus, and/or visual information at the respective set remarkableness levels described above to the driver. For example, when the driver is in the fatigue state, it is possible for the transmission section 37 to set higher remarkableness levels for a tactile stimulus or an auditory stimulus, and/or visual information to be provided to the driver as the driver has a higher degree of fatigue.

In the present embodiment, for example, when a driver has the fourth degree of fatigue, the transmission section 37 sets higher remarkableness levels for a tactile stimulus, an auditory stimulus, and visual information to be output through the HMI devices 3 than those in the case of the third degree of fatigue. In addition, when a driver has the fifth degree of fatigue, the transmission section 37 sets higher remarkableness levels for a tactile stimulus, an auditory stimulus, and visual information to be output through the HMI devices 3 than those in the case of the fourth degree of fatigue.

According to this configuration, it is possible to transmit a risk of contact with an object around the subject vehicle in accordance with the degree of fatigue of a driver at the moment in a manner that allows the driver to recognize the risk further more reliably.

It is to be noted that the transmission section 37 does not necessarily have to set remarkableness levels different from each other in height for all the degrees of fatigue in the configuration described above, but it is sufficient if remarkableness levels are different between at least two degrees of fatigue. For example, when a driver has the fourth or third degree of fatigue, it is possible for the transmission section 37 to set the remarkableness levels described above that are the same in height. When a driver has the fifth degree of fatigue, it is possible for the transmission section 37 to set a higher remarkableness level than the remarkableness level in the case of the fourth degree or third degree of fatigue.

When it is determined after the auditory stimulus and/or the visual information is provided to the driver that the driver has the line of sight in the direction of the risk position because the driver is in the fourth state, the transmission section 37 finishes an output of the auditory stimulus and/or the visual information in different manners corresponding to the degree of fatigue of the driver.

In the present embodiment, for example, when a driver has the third degree of fatigue, the transmission section 37 finishes outputs of an auditory stimulus and visual information at the time of the detection of the driver visually recognizing the risk position. In addition, when a driver has the fourth degree of fatigue, the transmission section 37 gradually decreases the remarkableness levels of an auditory stimulus and visual information at the time of the detection of the driver visually recognizing the risk position and finishes the outputs of the auditory stimulus and the visual information after a predetermined time passes after the detection described above. In addition, when a driver has the fifth degree of fatigue, the transmission section 37 keeps outputs of an auditory stimulus and visual information over a predetermined time without changing the remarkableness levels even after the detection of the driver visually recognizing the risk position. The transmission section 37 then gradually decreases the remarkableness levels of the auditory stimulus and the visual information after the predetermined time described above passes and finishes the outputs of the auditory stimulus and the visual information when a predetermined time further passes.

According to this configuration, even when the transmission of the presence of a risk, the risk level, and/or the risk position is started by outputting an auditory stimulus and/or visual information to a driver in the fatigue state, the output of the auditory stimulus and/or the visual information is finished in a manner corresponding to the degree of fatigue of the driver without waiting for the risk described above to disappear while the driver is visually recognizing the risk position. This makes it possible to avoid bothering the driver who recognizes the risk because an auditory stimulus and/or visual information is not excessively output to the driver. In addition, since an auditory stimulus and/or visual information is finished in a manner corresponding to the degree of fatigue, it is possible to guide the driver to an appropriate evasive action, for example, by securing the intensity (the intensity of an auditory stimulus or a visual stimulus) of a stimulus and/or the duration time of the stimulus necessary to make the driver in the fatigue state vigilant and then finishing the auditory stimulus and/or the visual stimulus.

It is to be noted that it is possible for the transmission section 37 to continue a tactile stimulus until the risk level decreases to less than a predetermined level in the configuration described above whether or not a driver has the line of sight in the direction of the risk position. Generally speaking, a tactile stimulus is a stimulus that a human may recognize more sensitively than an auditory stimulus and a visual stimulus. This allows a driver in the fatigue state to clearly recognize the presence of a risk while the risk is present even after the auditory stimulus and/or the visual information described above is finished.

Next, a procedure of an operation in the attention attracting system 1 will be described.

Figure 7:
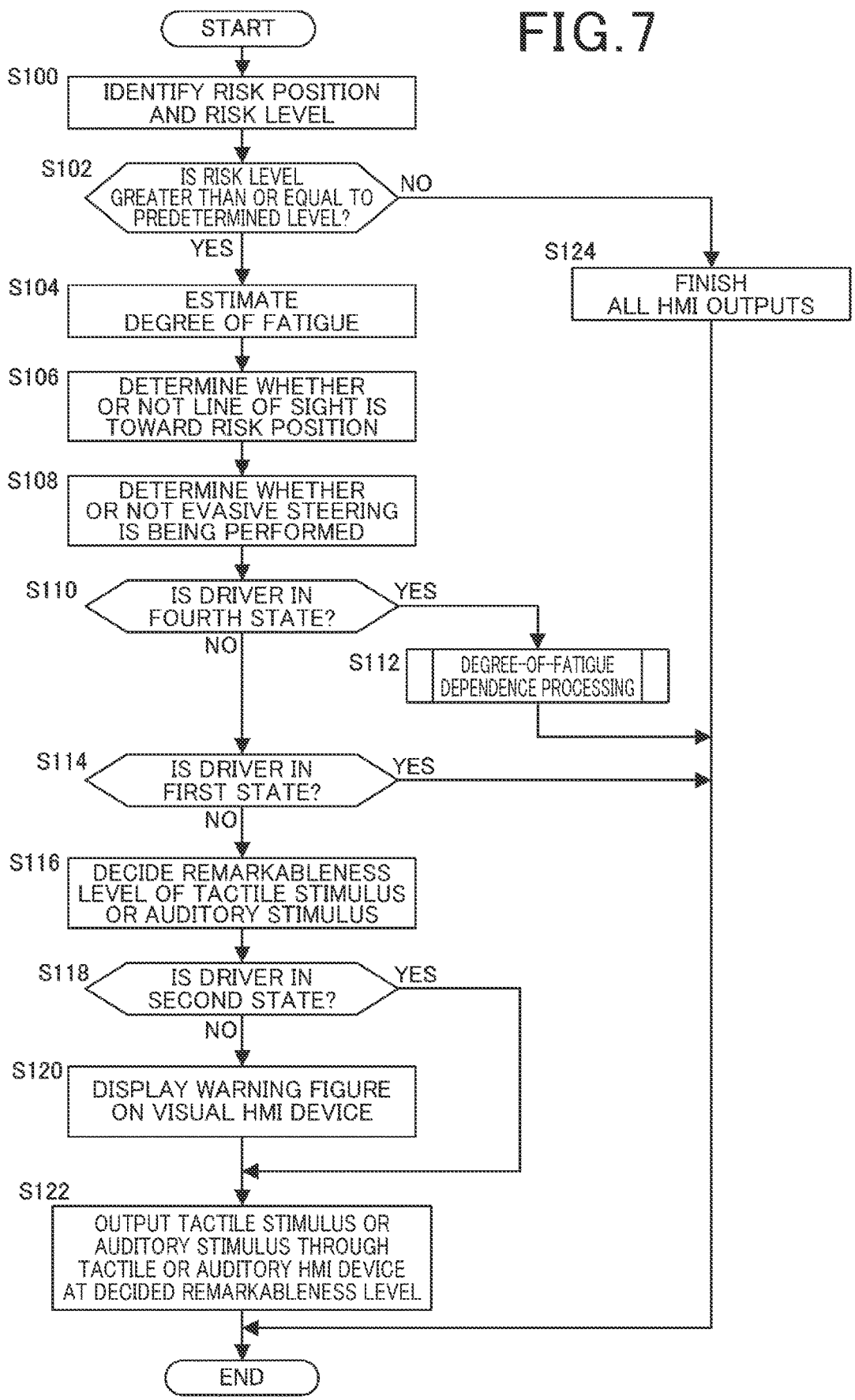
FIG. 7 is a flowchart illustrating a procedure of processing of an attention attracting method that is executed by the attention attracting system.

FIG. 7 is a flowchart illustrating a procedure of processing in an attention attracting method. The processing is executed by the processor 30 that is a computer of the attention attracting device 4 included in the attention attracting system 1. This processing is repeatedly executed at predetermined time intervals.

Once the processing is started, the risk identification section 33 first identifies a risk position and a risk level on the basis of information from the risk detection device 6 (S100). The risk position is a position having a strong possibility of contact occurring between the subject vehicle 2 and an object in an environment surrounding the subject vehicle 2. The risk level is the degree of the possibility of the above-described contact occurring at the risk position. Subsequently, the risk identification section 33 determines the presence or absence of a risk position whose risk level is greater than or equal to a predetermined level (S102).

In the presence of the risk position whose risk level is greater than or equal to the predetermined level (YES in S102), the fatigue estimation section 34 then estimates the degree of fatigue of the driver (S104). In addition, the line-of-sight determination section 35 determines whether or not the driver has the line of sight toward the risk position (i.e., whether or not the driver is visually recognizing the risk position) (S106) and the evasion determination section 36 determines whether or not the driver is performing evasive steering (S108).

Subsequently, the transmission section 37 determines whether or not the state of the driver is the fourth state described above on the basis of a result of the degree-of-fatigue estimation in step S104 (S110). When the state of the driver is the fourth state (YES in S110), the transmission section 37 then executes the degree-of-fatigue dependence processing (S112) and finishes this processing. In the degree-of-fatigue dependence processing S112, processing of making and finishing an output of the HMI device 3 in accordance with the degree of fatigue of the driver is performed. Specific processing in the degree-of-fatigue dependence processing will be described with reference to the flowchart illustrated in FIG. 8.

In contrast, when the state of the driver is not the fourth state (NO in S110), the transmission section 37 determines whether or not the state of the driver is the first state described above on the basis of results of the determinations in steps S104, S106, and S108 (S114). When the state of the driver is the first state (YES in S114), the transmission section 37 then finishes this processing.

In contrast, when the state of the driver is not the first state (NO in S114), the transmission section 37 decides the remarkableness level of a tactile stimulus or an auditory stimulus to be provided to the driver on the basis of the state of the driver and the risk level at the risk position described above (S116).

Next, the transmission section 37 determines whether or not the state of the driver is the second state (S118). When the state of the driver is not the second state, that is, the state of the driver is the third state (NO in S118), the predetermined warning graphic 50 indicating the risk position is then displayed on the visual HMI device 3c at the size corresponding to the risk level (S120). Subsequently, the transmission section 37 transmits the risk level to the driver at the remarkableness level decided in step S116 through the tactile HMI device 3a or the auditory HMI device 3b in accordance with whether the risk position is located in the region ahead of the subject vehicle 2 or the region behind the subject vehicle 2 (S122) to finish this processing.

In contrast, when the state of the driver is the second state in step S118 (YES in S118), the transmission section 37 brings the processing to step S122 and only transmits the risk level through the tactile HMI device 3a or the auditory HMI device 3b to finish this processing without displaying the warning graphic 50 through the visual HMI device 3c.

In contrast, in the absence of the risk position whose risk level is greater than or equal to the predetermined level in step S102 (NO in S102), the transmission section 37 finishes all the outputs related to the risk level and the risk position output by the HMI devices 3 (S124) and finishes this processing.

FIG. 8 is a flowchart illustrating a procedure of the degree-of-fatigue dependence processing executed in step S112 in FIG. 7. As described above, the degree-of-fatigue dependence processing in step S112 is executed when a driver is in the fourth state, that is, the fatigue state. As described above, when the degree of fatigue of a driver estimated by the fatigue estimation section 34 is in the third, fourth, and the fifth grades, the transmission section 37 determines that the driver is in the fatigue state.

In the degree-of-fatigue dependence processing, the transmission section 37 first determines on the basis of a result of the degree-of-fatigue estimation in step S104 whether or not the driver has the fifth degree of fatigue (S200). When the driver does not have the fifth degree of fatigue (NO in S200), the transmission section 37 then determines whether or not the driver has the fourth degree of fatigue (S208). When the driver does not have the fourth degree of fatigue, that is, the driver has the third degree of fatigue (NO in S208), the transmission section 37 then makes HMI outputs of a tactile stimulus, an auditory stimulus, and visual information for transmitting the risk level and/or the risk position described above through the HMI devices 3 at a first-level remarkableness level (S216). In this case, the first-level remarkableness level can be a level greater than the remarkableness level in the second state or the third state decided in step S116 in FIG. 7 or the remarkableness level of the visual display performed in step S120.

Next, the transmission section 37 determines on the basis of a result of the determination about the driver's line of sight in step S106 in FIG. 7 whether or not the driver is visually recognizing the risk position (S218). When the driver is visually recognizing the risk position (YES in S218), the auditory stimulus by the auditory HMI device 3b and the visual information displayed by the visual HMI device 3c are then immediately finished (S220) and the transmission section 37 returns to the processing in FIG. 7.

In contrast, when the driver is not visually recognizing the risk position in step S218 (NO in S218), the transmission section 37 returns to the processing in FIG. 7 while keeping the outputs of all the HMI devices 3.

Meanwhile, when the driver has the fourth degree of fatigue in step S208 (YES in S208), the transmission section 37 makes HMI outputs of a tactile stimulus, an auditory stimulus, and visual information for transmitting the risk level and/or the risk position described above through the HMI devices 3 at a second-level remarkableness level greater than the first-level remarkableness level (S210).

Next, as in step S218, the transmission section 37 determines whether or not the driver is visually recognizing the risk position (S212). When the driver is visually recognizing the risk position (YES in S212), the respective remarkableness levels of the tactile stimulus by the tactile HMI device 3a and the visual information displayed by the visual HMI device 3c are then gradually decreased and the tactile stimulus and the visual information are finished (S214) and the transmission section 37 returns to the processing in FIG. 7.

In contrast, when the driver is not visually recognizing the risk position in step S212 (NO in S212), the transmission section 37 returns to the processing in FIG. 7 while keeping the outputs of all the HMI devices 3.

Meanwhile, when the driver has the fifth degree of fatigue in step S200 (YES in S200), the transmission section 37 makes HMI outputs of a tactile stimulus, an auditory stimulus, and visual information for transmitting the risk level and/or the risk position described above through the HMI devices 3 at a third-level remarkableness level greater than the second-level remarkableness level (S202).

Next, as in steps S212 and S218, the transmission section 37 determines whether or not the driver is visually recognizing the risk position (S204). When the driver is visually recognizing the risk position (YES in S204), the respective remarkableness levels of the tactile stimulus by the tactile HMI device 3a and the visual information displayed by the visual HMI device 3c are then kept for a predetermined time. After that, the respective remarkableness levels are gradually decreased and the tactile stimulus and the visual information are finished (S206) and the transmission section 37 returns to the processing in FIG. 7.

In contrast, when the driver is not visually recognizing the risk position in step S204 (NO in S204), the transmission section 37 returns to the processing in FIG. 7 while keeping the outputs of all the HMI devices 3.

It is to be noted that tactile stimuli started in steps S202, S210, and S216 are finished when the risk level falls below a predetermined level in step S124 in FIG. 7.

It is to be noted that the present invention is not limited to the configurations in the embodiments described above, but it is possible to carry out the present invention in a variety of aspects within the scope that does not depart from the gist of the present invention.

Configurations Supported by Embodiments Above

The embodiments described above support the following configurations.

(Configuration 1) An attention attracting system including: HMI devices that are mounted on a subject vehicle; and an attention attracting device configured to transmit, to a driver, a possibility of contact between the subject vehicle and an object through the HMI devices, in which the HMI devices include a tactile HMI device, an auditory HMI device, and a visual HMI device, the tactile HMI device providing a stimulus to a tactile perception of the driver, the auditory HMI device outputting sound to the driver, the sound serving as an auditory stimulus, the visual HMI device transmitting visual information to the driver, the attention attracting device includes a risk identification section configured to identify a risk position and a risk level, the risk position being a position having a strong possibility of contact occurring between the subject vehicle and an object in an environment surrounding the subject vehicle, the risk level being a degree of the possibility of the contact occurring at the risk position, a fatigue estimation section configured to estimate a degree of fatigue of the driver, and a transmission section configured to transmit the risk position and the risk level to the driver, and the transmission section selects the HMI device to be used in accordance with the degree of fatigue of the driver, provides a tactile stimulus or an auditory stimulus to the driver through the tactile HMI device or the auditory HMI device at a remarkableness level corresponding to strength of the possibility of the contact indicated by the risk level, and transmits visual information to the driver through the visual HMI device, the visual information indicating a direction of the risk position viewed from the driver.

According to the attention attracting system according to Configuration 1, the different HMI devices are used for transmission in accordance with the degree of fatigue of a driver. This makes it possible to transmit a risk of contact with an object around the subject vehicle in accordance with the degree of fatigue of the driver at the moment in a manner that allows the driver to recognize the risk more reliably.

(Configuration 2) The attention attracting system according to Configuration 1, in which, when the risk position identified by the risk identification section is located in a region ahead of the subject vehicle, the transmission section provides height of the risk level to the driver through the tactile HMI device as a tactile stimulus, and when the risk position identified by the risk identification section is located in a region other than the region ahead of the subject vehicle, the transmission section provides the height of the risk level to the driver through the auditory HMI device as an auditory stimulus.

According to the attention attracting system according to Configuration 2, the HMI device to be used is switched to the tactile HMI device or the auditory HMI device in accordance with which of the region ahead of the subject vehicle and the region other than the region ahead of the subject vehicle has the risk position. This allows the driver to intuitively grasp which of the region ahead and the region behind has the risk position by receiving any of a tactile stimulus and an auditory stimulus.

(Configuration 3) The attention attracting system according to Configuration 1 or 2, in which the attention attracting device includes a line-of-sight determination section configured to determine whether or not the driver has a line of sight in the direction of the risk position, and an evasion determination section configured to determine whether or not the driver is performing evasive steering that is a steering action for evading the contact which is possible contact, and the transmission section identifies a state of the driver as any of a first state, a second state, a third state, and a fourth state on the basis of a result of a degree-of-fatigue estimation of the driver by the fatigue estimation section and results of determinations by the line-of-sight determination section and the evasion determination section, the first state being a state in which the driver is not in the fatigue state, has the line of sight in the direction of the risk position, and is performing the evasive steering, the second state being a state in which the driver is not in the fatigue state, has the line of sight in the direction of the risk position, and is not performing the evasive steering, the third state being a state in which the driver is not in the fatigue state and does not have the line of sight in the direction of the risk position, the fourth state being a state in which the driver is in the fatigue state, and provides the tactile stimulus or the auditory stimulus to the driver by using the tactile HMI device or the auditory HMI device unless the state of the driver is the first state.

According to the attention attracting system according to Configuration 3, the transmission section refrains from transmitting the risk of the contact to the driver with a tactile stimulus or an auditory stimulus in accordance with the degree of attention of the driver with respect to the risk of the contact when the driver is recognizing the risk of the contact and is performing evasive steering. This makes it possible to prevent the driver from being bothered by the unnecessary transmission of the risk of the contact. The degree of attention of the driver is grasped from the fatigue state of the driver, the presence or absence of the visual recognition of the risk position, and the presence or absence of evasive steering.

(Configuration 4) The attention attracting system according to Configuration 3, in which the transmission section sets the remarkableness level of the tactile stimulus or the auditory stimulus to be provided to the driver by using the tactile HMI device or the auditory HMI device to cause the remarkableness level to be higher when the driver is in the third state than the remarkableness level set when the driver is in the second state, and the remarkableness level to be higher when the driver is in the fourth state than the remarkableness level set when the driver is in the third state.

According to the attention attracting system according to Configuration 4, a tactile stimulus or an auditory stimulus is provided to the driver at a different remarkableness level in accordance with the degree of the attention of the driver to the risk of contact. This makes it possible to transmit information related to the risk of the contact in accordance with the degree of the attention described above in a manner that does not bother the driver.

(Configuration 5) The attention attracting system according to Configuration 3 or 4, in which the transmission section sets respective remarkableness levels of the tactile stimulus or the auditory stimulus, and/or the visual information at different levels in accordance with the degree of fatigue of the driver and provides the tactile stimulus or the auditory stimulus, and/or the visual information at the respective set remarkableness levels to the driver.

According to the attention attracting system according to Configuration 5, it is possible to transmit a risk of contact with an object around the subject vehicle in accordance with the degree of fatigue of a driver at the moment in a manner that allows the driver to recognize the risk further more reliably.

(Configuration 6) The attention attracting system according to Configuration 5, in which, when the driver is determined to have the line of sight in the direction of the risk position after the auditory stimulus and/or the visual information is provided to the driver, the transmission section finishes an output of the auditory stimulus and/or the visual information in different manners corresponding to the degree of fatigue of the driver.

The attention attracting system according to Configuration 6 makes it possible to guide the driver to an appropriate evasive action, for example, by securing the intensity (the intensity of an auditory stimulus or a visual stimulus) of a stimulus and/or the duration time of the stimulus necessary to make the driver in the fatigue state vigilant and then finishing the auditory stimulus and/or the visual stimulus in accordance with the degree of fatigue of the driver without excessively outputting a stimulus to the driver who recognizes the risk.

(Configuration 7) The attention attracting system according to any of Configurations 3 to 6, in which, when the risk position identified by the risk identification section is located in the region other than the region ahead of the subject vehicle, the line-of-sight determination section determines whether or not the driver has the line of sight in the direction of the risk position through a mirror included in the subject vehicle upon determining that the driver does not have the line of sight in the direction of the risk position.

The attention attracting system according to Configuration 7 makes it possible to appropriately determine whether or not the driver has the line of sight toward the risk position located in the region other than the region ahead of the subject vehicle on the basis of even the driver's line of sight through the mirror included in the subject vehicle.

(Configuration 8) The attention attracting system according to any of Configurations 1 to 7, in which the tactile HMI device is an electric seat belt that is provided to a driver's seat of the subject vehicle, the electric seat belt providing a tactile stimulus to the driver by changing tension of a seat belt worn by the driver, and the remarkableness level of the tactile stimulus corresponds to magnitude of the tension of the seat belt.

The attention attracting system according to Configuration 8 makes it possible to transmit the risk of the contact with a tactile stimulus without adding any equipment special to the driver.

(Configuration 9) The attention attracting system according to any of Configurations 1 to 8, in which the auditory HMI device is a speaker that is provided in a vehicle compartment of the subject vehicle, and the remarkableness level of the auditory stimulus corresponds to intensity, height of frequency, and/or shortness of a repetition cycle of sound that is output by the speaker and/or shortness of a change cycle of the intensity or the frequency.

The attention attracting system according to Configuration 9 makes it possible to transmit the risk of the contact by using the acoustics as the auditory stimulus in various manners.

(Configuration 10) The attention attracting system according to any of Configurations 1 to 9, in which the visual HMI device is a meter display device that is provided in an instrument panel of the subject vehicle, and the transmission section displays a predetermined figure on the meter display device, the predetermined figure being for transmitting, to the driver, the possibility of the contact, transmits, to the driver, the direction of the risk position viewed from the driver by using a display position of the predetermined figure on the meter display device, and transmits, to the driver, height of the risk level by using a size and/or a color of the predetermined figure on the meter display device.

According to the attention attracting system according to Configuration 10, the visual HMI device provides visual information in the same changing manner as that of a tactile stimulus or an auditory stimulus transmitted by the tactile HMI device or the auditory HMI device at the remarkableness level corresponding to the risk level. This allows the driver to recognize the height of the risk level more clearly.

(Configuration 11) An attention attracting method that is executed by a computer of an attention attracting system, the attention attracting system including HMI devices including a tactile HMI device, an auditory HMI device, and a visual HMI device, the HMI devices being each mounted on a subject vehicle, the tactile HMI device providing a stimulus to a tactile perception of a driver, the auditory HMI device outputting sound to the driver, the sound serving as an auditory stimulus, the visual HMI device transmitting visual information to the driver, and an attention attracting device configured to transmit, to the driver, a possibility of contact between the subject vehicle and an object through the tactile HMI device, the auditory HMI device, and/or the visual HMI device, the attention attracting method including: a risk identification step of identifying a risk position and a risk level, the risk position being a position having a strong possibility of contact occurring between the subject vehicle and an object in an environment surrounding the subject vehicle, the risk level being a degree of the possibility of the contact occurring at the risk position; a fatigue estimation step of estimating a degree of fatigue of the driver; and a transmission step of transmitting the risk position and the risk level to the driver, in which, in the transmission step, the HMI device to be used is selected in the degree of fatigue of the driver, a tactile stimulus or an auditory stimulus is provided to the driver through the tactile HMI device or the auditory HMI device at a remarkableness level corresponding to strength of the possibility of the contact indicated by the risk level, and visual information is transmitted to the driver through the visual HMI device, the visual information indicating a direction of the risk position viewed from the driver.

According to the attention attracting method according to Configuration 11, the different HMI devices 3 are used for transmission in accordance with the degree of fatigue of a driver. This makes it possible to transmit a risk of contact with an object around the subject vehicle in accordance with the degree of fatigue of the driver at the moment in a manner that allows the driver to recognize the risk more reliably.

REFERENCE SIGNS LIST 1 attention attracting system
2 subject vehicle
3 HMI device
3a tactile HMI device
3b auditory HMI device
3c visual HMI device
4 attention attracting device
5 vehicle control device
6 risk detection device
7 onboard camera
8 rear-view mirror
9a, 9b door mirror
20 driver's seat 21 seat belt
22 steering wheel
23 instrument panel
24 display device
25 windshield
30 processor
31 memory
32 program
33 risk identification section
34 fatigue estimation section
35 line-of-sight determination section
36 evasion determination section
37 transmission section
50 warning figure

What is claimed is:

1. An attention attracting system comprising:
   HMI devices that are mounted on a subject vehicle; and
   an attention attracting device comprising a processor that transmits, to a driver, a possibility of contact between the subject vehicle and an object through the HMI devices, wherein
   the HMI devices include a tactile HMI device, an auditory HMI device, and a visual HMI device, the tactile HMI device providing a stimulus to a tactile perception of the driver, the auditory HMI device outputting sound to the driver, the sound serving as an auditory stimulus, the visual HMI device transmitting visual information to the driver,
   the processor of the attention attracting device provides a risk identification section, a fatigue estimation section, and a transmission section, wherein:
      the risk identification section identifies a risk position and a risk level, the risk position being a position having a strong possibility of contact occurring between the subject vehicle and the object in an environment surrounding the subject vehicle, the risk level being a degree of the possibility of the contact occurring at the risk position,
      the fatigue estimation section estimates a degree of fatigue of the driver, and
      the transmission section transmits the risk position and the risk level to the driver, and
   the transmission section
      selects the HMI device to be used in accordance with the degree of fatigue of the driver,
      provides a tactile stimulus or an auditory stimulus to the driver through the tactile HMI device or the auditory HMI device at a remarkableness level corresponding to strength of the possibility of the contact indicated by the risk level, and
      transmits visual information to the driver through the visual HMI device, the visual information indicating a direction of the risk position viewed from the driver.

2. The attention attracting system according to claim 1, wherein
   when the risk position identified by the risk identification section is located in a region ahead of the subject vehicle, the transmission section provides height of the risk level to the driver through the tactile HMI device as a tactile stimulus, and
   when the risk position identified by the risk identification section is located in a region other than the region ahead of the subject vehicle, the transmission section provides the height of the risk level to the driver through the auditory HMI device as an auditory stimulus.

3. The attention attracting system according to claim 1, wherein
   the processor of the attention attracting device further provides a line-of-sight determination section and an evasion determination section, wherein:
      the line-of-sight determination section determines whether or not the driver has a line of sight in the direction of the risk position, and
      the evasion determination section determines whether or not the driver is performing evasive steering that is a steering action for evading the contact which is possible contact, and
   the transmission section
      identifies a state of the driver as any of a first state, a second state, a third state, and a fourth state on a basis of a result of a degree-of-fatigue estimation of the driver by the fatigue estimation section and results of determinations by the line-of-sight determination section and the evasion determination section,
         the first state being a state in which the driver is not in the fatigue state, has the line of sight in the direction of the risk position, and is performing the evasive steering,
         the second state being a state in which the driver is not in the fatigue state, has the line of sight in the direction of the risk position, and is not performing the evasive steering,
         the third state being a state in which the driver is not in the fatigue state and does not have the line of sight in the direction of the risk position,
         the fourth state being a state in which the driver is in the fatigue state, and
      provides the tactile stimulus or the auditory stimulus to the driver by using the tactile HMI device or the auditory HMI device unless the state of the driver is the first state.

4. The attention attracting system according to claim 3, wherein the transmission section sets the remarkableness level of the tactile stimulus or the auditory stimulus to be provided to the driver by using the tactile HMI device or the auditory HMI device to cause
   the remarkableness level to be higher when the driver is in the third state than the remarkableness level set when the driver is in the second state, and
   the remarkableness level to be higher when the driver is in the fourth state than the remarkableness level set when the driver is in the third state.

5. The attention attracting system according to claim 3, wherein the transmission section sets respective remarkableness levels of the tactile stimulus or the auditory stimulus, and/or the visual information at different levels in accordance with the degree of fatigue of the driver and provides the tactile stimulus or the auditory stimulus, and/or the visual information at the respective set remarkableness levels to the driver.

6. The attention attracting system according to claim 5, wherein, when the driver is determined to have the line of sight in the direction of the risk position after the auditory stimulus and/or the visual information is provided to the driver, the transmission section finishes an output of the auditory stimulus and/or the visual information in different manners corresponding to the degree of fatigue of the driver.

7. The attention attracting system according to claim 3, wherein, when the risk position identified by the risk identification section is located in a region other than a region ahead of the subject vehicle, the line-of-sight determination section determines whether or not the driver has the line of sight in the direction of the risk position through a mirror included in the subject vehicle upon determining that the driver does not have the line of sight in the direction of the risk position.

8. The attention attracting system according to claim 1, wherein
the tactile HMI device is an electric seat belt that is provided to a driver's seat of the subject vehicle, the electric seat belt providing a tactile stimulus to the driver by changing tension of a seat belt worn by the driver, and
the remarkableness level of the tactile stimulus corresponds to magnitude of the tension of the seat belt.

9. The attention attracting system according to claim 1, wherein
the auditory HMI device is a speaker that is provided in a vehicle compartment of the subject vehicle, and
the remarkableness level of the auditory stimulus corresponds to intensity, height of frequency, and/or shortness of a repetition cycle of sound that is output by the speaker and/or shortness of a change cycle of the intensity or the frequency.

10. The attention attracting system according to claim 1, wherein
the visual HMI device is a meter display device that is provided in an instrument panel of the subject vehicle, and
the transmission section
displays a predetermined figure on the meter display device, the predetermined figure being for transmitting, to the driver, the possibility of the contact,
transmits, to the driver, the direction of the risk position viewed from the driver by using a display position of the predetermined figure on the meter display device, and
transmits, to the driver, height of the risk level by using a size and/or a color of the predetermined figure on the meter display device.

11. An attention attracting method that is executed by a computer of an attention attracting system, the attention attracting system including
HMI devices including a tactile HMI device, an auditory HMI device, and a visual HMI device, the HMI devices being each mounted on a subject vehicle, the tactile HMI device providing a stimulus to a tactile perception of a driver, the auditory HMI device outputting sound to the driver, the sound serving as an auditory stimulus, the visual HMI device transmitting visual information to the driver, and
an attention attracting device configured to transmit, to the driver, a possibility of contact between the subject vehicle and an object through the tactile HMI device, the auditory HMI device, and/or the visual HMI device, the attention attracting method comprising:
a risk identification step of identifying a risk position and a risk level, the risk position being a position having a strong possibility of contact occurring between the subject vehicle and the object in an environment surrounding the subject vehicle, the risk level being a degree of the possibility of the contact occurring at the risk position;
a fatigue estimation step of estimating a degree of fatigue of the driver; and
a transmission step of transmitting the risk position and the risk level to the driver, wherein in the transmission step,
the HMI device to be used is selected in the degree of fatigue of the driver,
a tactile stimulus or an auditory stimulus is provided to the driver through the tactile HMI device or the auditory HMI device at a remarkableness level corresponding to strength of the possibility of the contact indicated by the risk level, and
visual information is transmitted to the driver through the visual HMI device, the visual information indicating a direction of the risk position viewed from the driver.

* * * * *